United States Patent
Smith et al.

(10) Patent No.: US 10,430,616 B2
(45) Date of Patent: *Oct. 1, 2019

(54) SYSTEMS AND METHODS FOR SECURE PROCESSING WITH EMBEDDED CRYPTOGRAPHIC UNIT

(71) Applicant: Square, Inc., San Francisco, CA (US)

(72) Inventors: Malcolm Ronald Smith, Toronto (CA); Kshitiz Vadera, Toronto (CA); Mark Phillip Zagrodney, Toronto (CA); Kevin Ka Wai Ng, Markham (CA); Afshin Rezayee, Richmond Hill (CA)

(73) Assignee: Square, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/859,036

(22) Filed: Dec. 29, 2017

(65) Prior Publication Data

US 2018/0247084 A1    Aug. 30, 2018

Related U.S. Application Data

(63) Continuation of application No. 14/749,992, filed on Jun. 25, 2015, now Pat. No. 9,886,596, which is a
(Continued)

(51) Int. Cl.
*G06F 11/30* (2006.01)
*G06F 12/14* (2006.01)
(Continued)

(52) U.S. Cl.
CPC ............ *G06F 21/72* (2013.01); *G06F 21/556* (2013.01); *H04L 9/0894* (2013.01);
(Continued)

(58) Field of Classification Search
USPC .......................................................... 713/189
See application file for complete search history.

(56) References Cited

U.S. PATENT DOCUMENTS

| 5,559,889 A | 9/1996 | Easter et al. |
| 6,874,083 B2 | 3/2005 | Sarangi et al. |

(Continued)

FOREIGN PATENT DOCUMENTS

| AU | 2014256377 A1 | 5/2015 |
| AU | 2017201800 A1 | 4/2017 |

(Continued)

OTHER PUBLICATIONS

National Institute of Standards and Technology, "Federal Information Processing Standards Publication 140-2: Security Requirements for Cryptographic Modules," May 25, 2001, pp. 1-69.
(Continued)

*Primary Examiner* — Jeffrey C Pwu
*Assistant Examiner* — Samuel Ambaye
(74) *Attorney, Agent, or Firm* — Maynard Cooper & Gale, LLP; Chitra M. Kalyanaraman, Esq.

(57) ABSTRACT

Processor system with a general purpose processor and a cryptographic processor dedicated to performing cryptographic operations and enforcing the security of critical security parameters. The cryptographic processor prevents exposure of critical security parameters outside the cryptographic processor itself, and instead implements a limited scripting engine, which can be used by the general purpose processor to execute operations that require the critical security parameters.

15 Claims, 8 Drawing Sheets

Related U.S. Application Data continuation of application No. 14/068,484, filed on Oct. 31, 2013, now Pat. No. 9,135,472.

(51) Int. Cl.
| | |
|---|---|
| *G06F 21/72* | (2013.01) |
| *G06F 21/55* | (2013.01) |
| *H04L 29/06* | (2006.01) |
| *H04L 9/08* | (2006.01) |
| *H04L 9/32* | (2006.01) |

(52) U.S. Cl.
CPC ........ *H04L 9/3236* (2013.01); *H04L 63/0853* (2013.01); *H04L 63/0492* (2013.01); *H04L 2463/102* (2013.01)

(56) References Cited

U.S. PATENT DOCUMENTS

| | | | |
|---|---|---|---|
| 6,895,517 | B2 | 5/2005 | Wang |
| 7,581,128 | B2 | 8/2009 | Yamada et al. |
| 7,837,110 | B1 | 11/2010 | Hess et al. |
| 7,861,097 | B2 | 12/2010 | Smeets et al. |
| 8,613,387 | B1 | 12/2013 | Billett et al. |
| 8,990,121 | B1 | 3/2015 | Guise et al. |
| 9,135,472 | B2 | 9/2015 | Smith et al. |
| 9,390,412 | B2 | 7/2016 | Weber et al. |
| 9,426,127 | B2 | 8/2016 | Huxham et al. |
| 9,542,678 | B1 | 1/2017 | Glashan et al. |
| 9,665,870 | B1 | 5/2017 | Rezayee et al. |
| 9,818,004 | B1 | 11/2017 | Rezayee et al. |
| 9,870,558 | B1 | 1/2018 | Rezayee et al. |
| 10,055,234 | B1 | 8/2018 | Rao |
| 10,068,223 | B1 | 9/2018 | Rezayee et al. |
| 10,235,667 | B2 | 3/2019 | Rezayee et al. |
| 2002/0002429 | A1 | 1/2002 | Sugimura et al. |
| 2004/0158784 | A1 | 8/2004 | Abuhamdeh et al. |
| 2004/0255199 | A1 | 12/2004 | Yamashita |
| 2005/0022042 | A1 | 1/2005 | Tam et al. |
| 2005/0223211 | A1 | 10/2005 | Sukegawa et al. |
| 2007/0001720 | A1 | 1/2007 | Li et al. |
| 2007/0226806 | A1 | 9/2007 | Tung et al. |
| 2008/0130893 | A1* | 6/2008 | Ibrahim ................. G06F 21/572 380/277 |
| 2008/0183912 | A1 | 7/2008 | Monroe et al. |
| 2008/0271001 | A1 | 10/2008 | Nonomura et al. |
| 2009/0109718 | A1 | 4/2009 | Wu et al. |
| 2009/0138748 | A1 | 5/2009 | Kim et al. |
| 2009/0282261 | A1 | 11/2009 | Khan et al. |
| 2009/0327569 | A1 | 12/2009 | Titone et al. |
| 2009/0327795 | A1 | 12/2009 | Priel et al. |
| 2010/0070749 | A1 | 3/2010 | Tsai |
| 2010/0070791 | A1 | 3/2010 | Priel et al. |
| 2010/0077232 | A1 | 3/2010 | Jahagirdhar et al. |
| 2010/0125554 | A1 | 5/2010 | Jennings et al. |
| 2010/0211507 | A1 | 8/2010 | Aabye et al. |
| 2010/0235618 | A1 | 9/2010 | Eiforth et al. |
| 2011/0222322 | A1 | 9/2011 | Kris et al. |
| 2011/0271070 | A1 | 11/2011 | Worthington et al. |
| 2011/0289294 | A1* | 11/2011 | Maeda ..................... G06F 21/74 711/163 |
| 2013/0070514 | A1 | 3/2013 | Weiss et al. |
| 2013/0086375 | A1 | 4/2013 | Lyne et al. |
| 2014/0019741 | A1 | 1/2014 | Nautiyal et al. |
| 2014/0074637 | A1 | 3/2014 | Hammad |
| 2014/0077781 | A1 | 3/2014 | Murakami et al. |
| 2014/0108786 | A1 | 4/2014 | Kreft |
| 2014/0114495 | A1 | 4/2014 | Larrson et al. |
| 2015/0046335 | A1 | 2/2015 | Huxham et al. |
| 2015/0052064 | A1 | 2/2015 | Karpenko et al. |
| 2015/0208356 | A1 | 7/2015 | Niu et al. |
| 2015/0227932 | A1 | 8/2015 | Huxham et al. |
| 2015/0356299 | A1 | 12/2015 | Barkelew et al. |
| 2016/0104154 | A1 | 4/2016 | Milov et al. |
| 2016/0179163 | A1 | 6/2016 | Haider et al. |
| 2016/0370837 | A1 | 12/2016 | Shi et al. |
| 2017/0068960 | A1 | 3/2017 | Kwak et al. |
| 2017/0091762 | A1 | 3/2017 | Rezayee et al. |
| 2017/0184642 | A1 | 6/2017 | Menard et al. |
| 2017/0236125 | A1 | 8/2017 | Guise et al. |
| 2017/0371679 | A1 | 12/2017 | Chandrasekhar et al. |

FOREIGN PATENT DOCUMENTS

| | | |
|---|---|---|
| CA | 2 868 644 A1 | 4/2015 |
| MX | 2014013295 A | 11/2015 |
| WO | 2008/156328 A2 | 12/2008 |

OTHER PUBLICATIONS

National Institute of Standards and Technology, "Annex A: Approved Security Functions for FIPS PUB 140-2, Security Requirements for Cryptographic Modules," May 30, 2012, pp. 1-9.
National Institute of Standards and Technology, "Annex B: Approved Protection Profiles for FIPS PUB 140-2, Security Requirements for Cryptographic Modules," Aug. 12, 2011, pp. 1-6.
Non-Final Office Action dated Feb. 4, 2015, for U.S. Appl. No. 14/068,484, of Smith, M.R., et al., filed Oct. 31, 2013.
Notice of Allowance dated Jun. 4, 2015, for U.S. Appl. No. 14/068,484, of Smith, M.R., et al., filed Oct. 31, 2013.
Examination Report dated Nov. 20, 2015, for New Zealand Patent Application No. 701459, of Smith, M., et al., filed Oct. 29, 2014.
Examination Report for New Zealand Patent Application No. 701459, dated Apr. 29, 2016.
Further Examination Report for New Zealand Patent Application No. 701459, dated Jul. 13, 2016.
Office Action for Mexican Patent Application No. 2014013295, dated Aug. 4, 2016 [See English Translation].
Notice of Acceptance for New Zealand Patent Application No. 701459, dated Nov. 21, 2016.
Notice of Acceptance for Australian Patent Application No. 2014256377, dated Dec. 12, 2016.
Examiner's Requisition for Canadian Patent Application No. 2,868,644, dated Jun. 28, 2017.
Non-Final Office Action dated Jun. 21, 2017, for U.S. Appl. No. 14/749,992, of Smith, M.R., et al., filed Jun. 25, 2015.
Notice of Allowance dated Sep. 22, 2017, for U.S. Appl. No. 14/749,992, of Smith, M.R., et al., filed Jun. 25, 2015.
National Institute of Standards and Technology, "Federal Information Processing Standard (FIPS) 140-1: Security Requirements for Cryptographic Modules," Jan. 11, 1994, pp. 1-55.
Notice of Allowance dated Jul. 17, 2017, for U.S. Appl. No. 15/253,813, of Rezayee, A., et al., filed Aug. 31, 2016.
Notice of Allowance dated Aug. 25, 2017, for U.S. Appl. No. 15/631,785, of Rezayee, A., et al., filed Jun. 23, 2017.
Notice of Allowance dated Sep. 14, 2017, for U.S. Appl. No. 15/631,785, of Rezayee, A., et al., filed Jun. 23, 2017.
Non-Final Office Action dated Feb. 8, 2018, for U.S. Appl. No. 15/846,196, of Rezayee, A., et al., filed Dec. 18, 2017.
First Examination Report for Australian Patent Application No. 2017201800, dated Mar. 21, 2018.
Notice of Allowance dated May 2, 2018, for U.S. Appl. No. 15/846,196, of Rezayee, A., et al., filed Dec. 18, 2017.
Notice of Acceptance for Australian Patent Application No. 2017201800, dated Jul. 4, 2018.
International Search Report and Written Opinion for International Application No. PCT/US2018/039060, dated Sep. 3, 2018.
Examiner Requisition for Canadian Patent Application No. 2,868,644, dated Sep. 13, 2018.
Non-Final Office Action dated Oct. 22, 2018, for U.S. Appl. No. 15/721,872, of Rezayee, A., et al., filed Sep. 30, 2017.
Notice of Allowance dated Oct. 29, 2018, for U.S. Appl. No. 16/120,398, of Rezayee, A., et al., filed Sep. 3, 2018.
Notice of Allowance dated Mar. 22, 2019, for U.S. Appl. No. 15/396,611, of Ng., K.K.W., et al., filed Dec. 31, 2016.
International Search Report and Written Opinion for International Application No. PCT/US2018/053494, dated Jan. 29, 2019.

(56) References Cited

OTHER PUBLICATIONS

Notice of Allowance dated Dec. 3, 2018, for U.S. Appl. No. 16/120,398, of Rezayee, A., et al., filed Sep. 3, 2018.
Notice of Allowance dated Feb. 7, 2019, for U.S. Appl. No. 15/721,872, of Rezayee, A., et al., filed Sep. 30, 2017.

* cited by examiner

SYSTEMS AND METHODS FOR SECURE PROCESSING WITH EMBEDDED CRYPTOGRAPHIC UNIT

CROSS-REFERENCE TO RELATED APPLICATIONS

This application is a continuation of U.S. patent application Ser. No. 14/749,992, filed on Jun. 25, 2015, entitled "SYSTEMS AND METHODS FOR SECURE PROCESSING WITH EMBEDDED CRYPTOGRAPHIC UNIT", which is incorporated herein by reference. U.S. patent application Ser. No. 14/749,992 is a continuation of U.S. patent application Ser. No. 14/068,484, filed on Oct. 31, 2013, entitled "SYSTEMS AND METHODS FOR SECURE PROCESSING WITH EMBEDDED CRYPTOGRAPHIC UNIT", which is incorporated herein by reference.

FIELD

The described embodiments relate to secure transaction processing and, in particular, to apparatus and methods for facilitating secure transaction processing using a hardware processor.

BACKGROUND

Payment cards, such as debit and credit cards, enjoy widespread use among consumers. New devices, such as mobile phones with Near-Field Communication (NFC) functionality, are also joining payment cards as a means of payment. These payment methods generally rely upon a merchant having a point-of-sale (POS) terminal that is capable of handling the payment transaction, for example to verify that the payment card is present and valid.

Generally, POS terminals must be certified for compliance with accepted security standards before they will be accepted by payment card issuers. One common certification is for compliance with the Federal Information Processing Standards (FIPS) 140 series of computer security standards. The most recently issued version of the 140 series is the FIPS 140-2 standard.

FIPS 140-2 defines four levels of security, from "Level 1" to "Level 4". Level 1 is the lowest level standard and imposes only limited requirements. Level 2 requires physical tamper evidence measures and role-based authentication. Level 3 adds the requirement for physical or logical separation for interfaces via which "critical security parameters" are input or output. Finally, Level 4 requires even more stringent physical security requirements, and protections against environmental attacks.

FIPS certification is a time consuming process that can take many months. Moreover, any modifications to a certified module require an update to the FIPS certification if it is to be maintained. However, when designing a hardware device that is to be FIPS certified, it can be difficult to accurately forecast all application requirements. Hardware design has long lead times, which can be compounded by the delay required to obtain FIPS certification. It would be preferable to offer a flexible environment in association with a FIPS-certified cryptographic module, without crossing over into a "modifiable environment" (e.g., general purpose operating systems) that requires extensive additional certification.

SUMMARY

In a first broad aspect, there is provided a non-transitory computer readable medium storing instructions executable by a cryptographic processor, the instructions which when executed by the cryptographic processor, cause the cryptographic processor to carry out a method of cryptographic processing in conjunction with a general purpose processor, the method comprising: receiving a script identifier from the general purpose processor; verifying that a script identified by the script identifier is authorized for execution on the cryptographic processor; and executing the script to produce a script result.

The method may further comprise determining whether the script result comprises a critical security parameter that cannot be output from the cryptographic processor in unencrypted form.

The method may further comprise encrypting at least the critical security parameter in the script result using a secret key stored in a protected memory of the cryptographic processor.

In some cases, the protected memory of the cryptographic processor is not readable externally to the cryptographic processor.

The method may further comprise transmitting the script result to the general purpose processor.

The method may further comprise: receiving the script from the general purpose processor; and retrieving a script verification value from a protected memory of the cryptographic processor, the protected memory not readable by the general purpose processor, wherein the verifying comprises computing a second script verification value based on the received script, and comparing the second script verification value to the retrieved script verification value.

In some cases, the instructions specify a limited instruction set that limits instructions able to be used in the script. In some cases, the limited instruction set is non-Turing-equivalent. In some cases, the limited instruction set excludes conditional branching instructions. In some cases, the limited instruction set excludes loop instructions.

In another broad aspect, there is provided a cryptographic processing unit for cryptographic processing in conjunction with a general purpose processor, the cryptographic processing unit comprising: a cryptographic processor, the cryptographic processor configured to: receive a script identifier from the general purpose processor; verify that a script identified by the script identifier is authorized for execution on the cryptographic processor; and execute the script to produce a script result.

In some cases, the cryptographic processor is further configured to determine whether the script result comprises a critical security parameter that cannot be output from the cryptographic processor in unencrypted form.

In some cases, the cryptographic processing unit further comprises a protected memory that stores a secret key, and the cryptographic processor is further configured to encrypt at least the critical security parameter in the script result using the secret key.

In some cases, the protected memory is not readable externally to the cryptographic processor.

In some cases, the cryptographic processor is further configured to transmit the script result to the general purpose processor.

In some cases, the cryptographic processing unit further comprises a protected memory not readable by the general purpose processor, wherein the cryptographic processor is further configured to: receive the script from the general purpose processor; and retrieve a script verification value from the protected memory, wherein the verifying comprises computing a second script verification value based on the received script, and comparing the second script verification value to the retrieved script verification value.

In some cases, the cryptographic processing unit further comprises, a non-transitory computer readable memory, wherein the cryptographic processor is configured by instructions stored in the non-transitory computer readable memory, and wherein the instructions specify a limited instruction set that limits instructions able to be used in the script.

In some cases, the limited instruction set is non-Turing-equivalent. In some cases, the limited instruction set excludes conditional branching instructions. In some cases, the limited instruction set excludes loop instructions.

In some cases, the general purpose processor executes a set of instructions stored in a general non-transitory computer readable memory, and the cryptographic processing unit is configured to: access the general non-transitory computer readable memory to read the set of instructions; and verify, using at least one verification value stored in the protected memory, that the set of instructions has not been altered.

In some cases, the general non-transitory computer readable memory is accessible via a general debugging interface, and the cryptographic processing unit further comprises a cryptographic processing unit debugging interface, wherein each of the general debugging interface and the cryptographic processing unit debugging interface is independently controlled.

In some cases, the general debugging interface is controlled using a first electronic fuse block, and the cryptographic processing unit comprises a second electronic fuse block for controlling the cryptographic processing unit debugging interface.

In some cases, the cryptographic processor is configured to control the first and second electronic fuse blocks.

In some cases, the general debugging interface and the cryptographic processing unit debugging interface are JTAG interfaces.

In some cases, the cryptographic processing unit further comprises a clock source for both the general purpose processor and the cryptographic processor, wherein the clock source is manipulable by the cryptographic processor but not the general purpose processor.

In some cases, the cryptographic processing unit further comprises a power supply for providing power to the general purpose processor and the cryptographic processor, wherein the power supply is controllable by the cryptographic processor but not the general purpose processor.

In another broad aspect, there is provided a cryptographic processor system comprising: a general purpose unit comprising: a general purpose processor configured to execute a general instruction set; a cryptographic unit comprising: a protected memory not readable by the general purpose processor; and a cryptographic processor configured to: receive a script identifier from the general purpose processor; verify that a script identified by the script identifier is authorized for execution on the cryptographic processor; and execute the script to produce a script result.

In some cases, the cryptographic processor system further comprises a communications interface between the general purpose processor and the cryptographic processor.

In some cases, the communications interface is a universal asynchronous receiver transmitter, and wherein the universal asynchronous receiver transmitter communicates with each of the general purpose processor and the cryptographic processor via a peripheral bus.

In some cases, the cryptographic processor system further comprises a general debugging interface coupled to the general purpose unit and a cryptographic unit debugging interface coupled to the cryptographic processing unit, wherein each of the general debugging interface and the cryptographic unit debugging interface is independently controlled.

In some cases, the general debugging interface is controlled using a first electronic fuse block, and the cryptographic unit debugging interface is controlled using a second electronic fuse block.

In some cases, both the first and second electronic fuse blocks are controllable by the cryptographic processor.

In some cases, the general debugging interface and the cryptographic unit debugging interface are JTAG interfaces.

In some cases, the cryptographic processor system further comprises a clock source for both the general purpose processor and the cryptographic processor, wherein the clock source is settable by the cryptographic processor but not the general purpose processor.

In some cases, the cryptographic processor system further comprises a power supply for both the general purpose processor and the cryptographic processor, wherein the power supply is controllable by the cryptographic processor but not the general purpose processor.

In some cases, the cryptographic processor is further configured to determine whether the script result comprises a critical security parameter that cannot be output from the cryptographic processor in unencrypted form.

In some cases, the protected memory stores a secret key, and the cryptographic processor is further configured to encrypt at least the critical security parameter in the script result using the secret key.

In some cases, the protected memory is not readable externally to the cryptographic processing unit.

In some cases, the cryptographic processor is further configured to transmit the script result to the general purpose processor.

In some cases, the cryptographic processor is further configured to: receive the script from the general purpose processor; and retrieve a script verification value from the protected memory, wherein the verifying comprises computing a second script verification value based on the received script, and comparing the second script verification value to the retrieved script verification value.

In some cases, the cryptographic processing unit further comprises a non-transitory computer readable memory, wherein the cryptographic processor is configured by instructions stored in the non-transitory computer readable memory, and wherein the instructions specify a limited instruction set that limits instructions able to be used in the script.

In some cases, the limited instruction set is non-Turing-equivalent. In some cases, the limited instruction set excludes conditional branching instructions. In some cases, the limited instruction set excludes loop instructions.

In some cases, the cryptographic processor is configured to halt the general purpose processor if a fault is detected.

In some cases, the cryptographic unit is configured to flush state if a fault is detected, and to disable at least one external interface of the processor system.

In some cases, the cryptographic processor system further comprises a memory access block, wherein the general purpose unit further comprises a general purpose unit computer-readable memory storing a set of instructions executable by the general purpose processor, and wherein the cryptographic processor is configured to: access the general purpose unit computer readable memory via the memory access block to read the set of instructions; verify, using at least one verification value stored in the protected memory, that the set of instructions has not been altered.

In some cases, the general purpose unit comprises a general volatile memory, and the cryptographic unit comprises a protected volatile memory that is accessible only to the cryptographic processor.

In some cases, the cryptographic processor is configured to write a data item to the protected volatile memory.

In some cases, the cryptographic unit is configured to read the data item from the protected volatile memory upon subsequently receiving a script for execution.

In some cases, the cryptographic unit is certified for compliance with a computer security standard, and the general purpose unit is excluded from certification. In some cases, the computer security standard is FIPS 140-2. In some cases, the computer security standard is FIPS 140-2 Level 3.

In some cases, the general purpose unit, the cryptographic unit and the communications interface are provided on a single die. In some cases, the general purpose unit is provided on a first die and the cryptographic unit is provided on a second die.

DRAWINGS

A preferred embodiment of the present invention will now be described in detail with reference to the drawings, in which.

Figure 1:
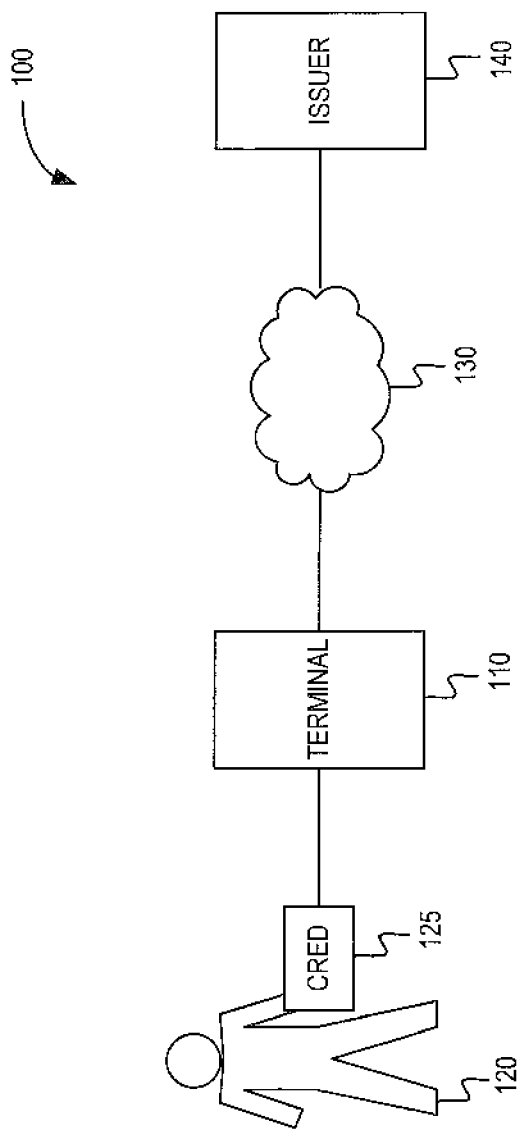
FIG. 1 is a block diagram of a transaction processing system in accordance with an example embodiment.

The drawings are provided for the purposes of illustrating various aspects and features of the example embodiments described herein. Where considered appropriate, reference numerals may be repeated among the figures to indicate corresponding or analogous elements.

DESCRIPTION

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein.

The described embodiments generally provide a hardware platform that provides a FIPS-compliant cryptographic processing element in combination with a flexible, general purpose processing element, where the general purpose element is not subject to the more stringent requirements of FIPS certification (e.g., the general purpose element can be excluded from the requirements of FIPS 140-2 Level 3). The cryptographic processing element can be certified to perform a limited set of instructions that it receives from the general purpose element, generally in the form of a sequence of commands (e.g., a script) within the secure processor environment. However this limited instruction set nevertheless provides a comprehensive suite of operations used in cryptographic operations, to minimize the need for subsequent modifications to the cryptographic processing element. In contrast, the general purpose processing element can execute arbitrary code without requiring re-certification of the entire device. However, the general purpose processing does not compromise the security or the functionality of the cryptographic processing element.

The described embodiments provide a processor system intended to meet FIPS 140-2 Level 3 certification requirements, and Payment Card Industry Point of Sale PIN Transaction Security Standard (PCI PTS) certification for Point of Sale (POS) applications.

In accordance with the FIPS security model, the described embodiments make a distinction between ordinary Users and a Cryptography Officer (CO). All access to the module is authenticated in some fashion. All users, including the CO, have unique user identifiers (IDs). Users are able to securely use their keys within the cryptographic processing element module, with access controllable on a per-user basis. It will be understood that Users may include specific application programs that reside or execute in the general purpose processor of the system.

Referring now to FIG. 1, there is illustrated a block diagram of a transaction processing system. System 100 may be generally used to carry out financial transactions, such as retail payment and the like. In some embodiments, system 100 may be used to perform authentication transactions, for example verifying a user's credential as at a government office.

System 100 includes an issuer server 140, a data network 130, a terminal device 110, and a user credential 125, which is typically in the possession of an end user 120.

User credential 125 may be a credit card equipped with a GlobalPlatform Secure Element or other smart chip. User credential 125 may further be equipped for contactless communication using, for example, radiofrequency identification (RFID) or other related technologies (e.g., ISO/IEC 14443/15693, Sony Felica, NFC, etc.). In some cases, user credential 125 may be a hardware device, such as a smartphone, equipped with a NFC interface.

In use, user credential 125 is presented to terminal 110, which is equipped with a suitable card reader device. For example, if user credential 125 is equipped for contactless communication, terminal 110 may be equipped with a RFID reader to interrogate and communicate with the user credential.

Terminal 110 is further equipped with a network interface, as described below, for communication with issuer server 140 via data network 130.

Network 130 can include a local area network or a wide area network (e.g., the Internet), or some combination thereof. In general, communications between terminal 110 and issuer server 140 are encrypted, either using a suitable encryption protocol, a secure virtual private network, or both. In some embodiments, terminal 110 may be directly coupled to an issuer server 140 via dedicated communication lines.

Issuer server 140 can include one or more computer servers operated by the issuers of credential 125, and configured to authenticate and verify transactions carried out using credential 125. Issuer server 140 is shown as a single entity for ease of exposition, however it will be understood that multiple parties may work in conjunction to provide the services attributed herein to issuer server 140.

Figure 2:
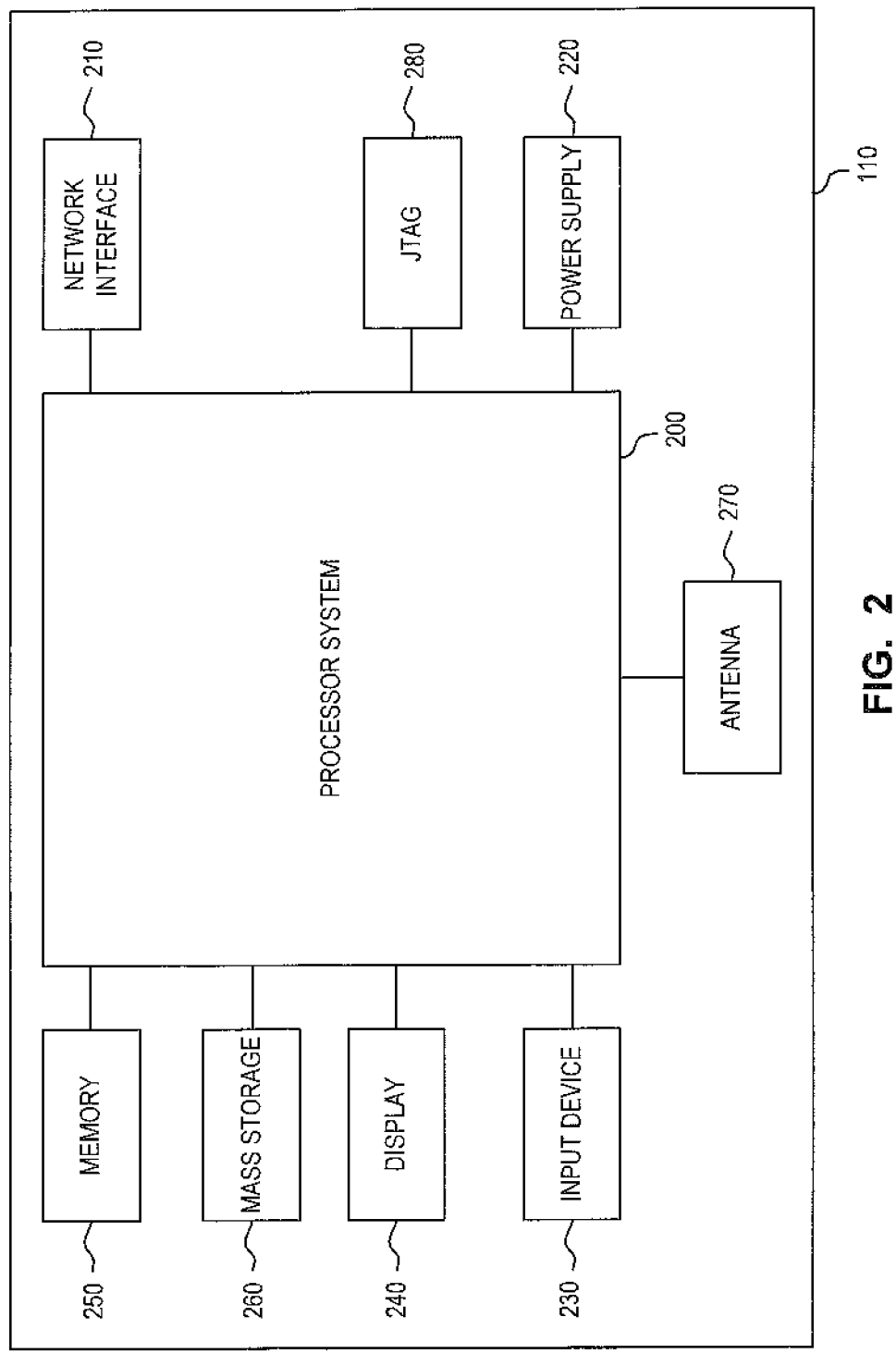
FIG. 2 is a system block diagram of an example terminal for use with the system of FIG. 1.

Referring now to FIG. 2, there is illustrated a system block diagram of an example terminal, such as terminal 110.

Terminal 110 includes a cryptographic processor system 200, a network interface 210, a power supply 220 (e.g., battery), an input device 230 (e.g., keyboard/keypad), an output device 240 (e.g., display), a volatile memory 250 and a non-volatile memory 260. Terminal 110 may further include an antenna 270 (e.g., for NFC). In other embodiments, terminal 110 may include a contact-based card reader (not shown).

Terminal 110 also generally includes one or more testing and general debugging interfaces 280, such as a port compliant with the IEEE 1149.1 Standard Test Access Port and Boundary-Scan Architecture, also sometimes referred to as the Joint Test Action Group (JTAG) port. General debugging interface 280 allows a programming device to transfer firmware to an internal non-volatile memory of terminal 110, as described herein.

Network interface 210 may be a wired or wireless communication interface, such as for the Ethernet or IEEE 802.11 protocol families for network communication.

Volatile memory 250 may be a random access memory, used by cryptographic processor system 200 to temporarily store data and computer executable instructions. Non-volatile memory 260 may be a mass storage memory, such as flash memory, used by cryptographic processor system 200 for long-term storage of programs and data.

Figure 3:
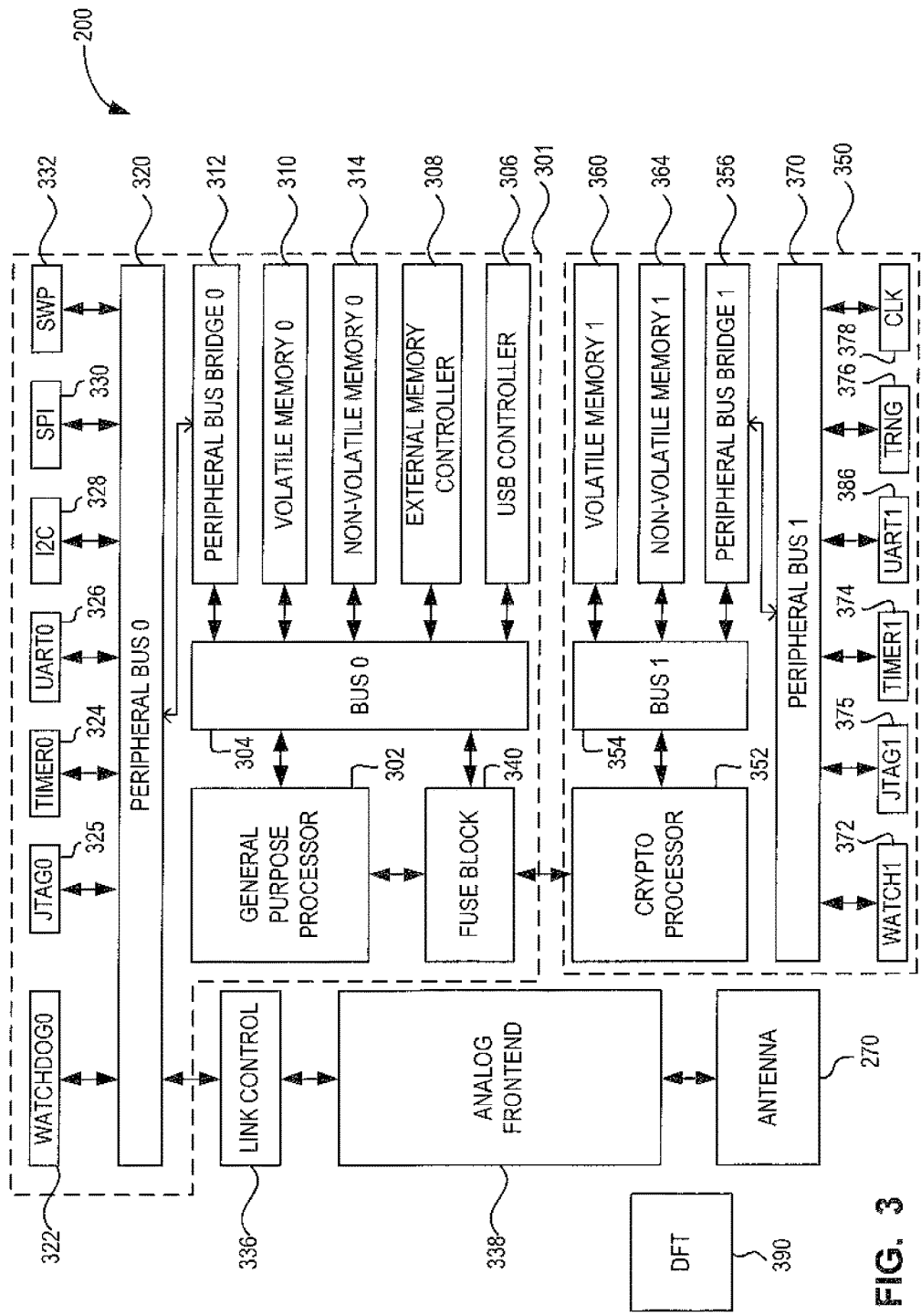
FIG. 3 is a system block diagram of an example cryptographic processor system for use with the terminal of FIG. 2.

Cryptographic processor system 200 is a computer processor or processors, as described herein. Referring now to FIG. 3, there is illustrated a system block diagram of an example cryptographic processor system 200.

As illustrated, cryptographic processor system 200 is a dual core system-on-chip processor. System 200 can be generally divided into two main portions, a first, general purpose unit 301, and a second cryptographic unit 350, which may be referred to as the "protected" or "secured" portion. In general, the general purpose unit 301 has access to input-output interfaces for external communications. In contrast, the cryptographic unit 350 has limited, or no, external interfaces, but can enable or disable the interfaces of the general purpose unit 301. Likewise, the cryptographic unit controls important elements of the system 200, including the system clock 378, which can be controlled to throttle or disable the general purpose unit when needed.

Cryptographic processor system 200 can be implemented using the Advanced Microcontroller Bus Architecture (AMBA). However, it will be understood that other specifications may be followed in designing processor system 200.

General purpose processor 302 is a general purpose processor, such as a Reduced Instruction Set Computing (RISC) processor, which is coupled to a first hardware bus 304, such as the Advanced High-performance Bus (AHB). Similarly, cryptographic processor 352 is coupled to a second hardware bus 354. First and second hardware busses 304 and 354 are not directly coupled to each other.

General purpose processor 302 is coupled, via the first hardware bus 304, to a universal serial bus (USB) communications interface 306, an external memory controller 308, an internal volatile memory 310 (general volatile memory), a first peripheral bus bridge 312, and an internal non-volatile memory 314 (general non-volatile memory).

Non-volatile memory 314 stores the firmware used by general purpose processor 302, which includes data and one or more control programs and application programs executed by general purpose processor 302.

First peripheral bus bridge 312 is coupled to a peripheral bus 320, such as an Advanced Peripheral Bus (APB), which is further coupled to other peripheral devices, such as a watch dog 322, an external timer 324, a JTAG interface 325, a Universal Asynchronous Receiver-Transmitter (UART) 326, an Inter-Integrated Circuit (I2C) port 328, and a Serial Peripheral Interface (SPI) 330 for connecting to devices such as output device 240, input device 230, etc. A Single Wire Protocol (SWP) interface 332 may also be provided to interface with a Subscriber Identity Module (SIM) card, for example.

Peripheral bus 320 is also coupled to a radio link control module 336, which is further coupled to an analog frontend 338 for NFC or RFID communications, for example.

Cryptographic processor 352 may also be a RISC processor, which is coupled, via the second hardware bus 354 to a second peripheral bus bridge 356, an internal volatile memory 360 (protected volatile memory) and an internal non-volatile memory 364 (protected non-volatile memory). Both volatile memory 360 and non-volatile memory 364 may be considered as part of a protected memory.

Non-volatile memory 364 stores the firmware used by cryptographic processor 352, which includes data and one or more control programs executed by cryptographic processor 352. Data stored in non-volatile memory 364 is generally protected by storing in encrypted form, to prevent offline tampering.

Internal volatile memory 360 may be subdivided into a number of smaller volatile memories. In particular, the volatile memory 360 may have a battery-backed portion and a non-battery-backed portion. Part of the non-battery-backed portion may be divided between session storage, which is cleared each time a user logs out, and a semi-persistent portion, which retains data between user sessions.

If an attack is detected, or if cryptographic processor 352 identifies a fault in a script under execution, volatile memory 360 may be protected by immediately erasing or zeroing data and, in particular, critical security parameters may be removed from volatile memory 360.

The battery backed portion may be used to store critical keys (e.g., a master key to decrypt non-volatile memory contents).

Since the volatile memory 360 and non-volatile memory 364 are only connected to the second hardware bus 354, only the cryptographic processor 352 has access to these memories. In particular, neither general purpose processor 302, nor any peripheral or external device can directly access these memories.

Second peripheral bus bridge 356 is coupled to a second peripheral bus 370, such as an APB, which is coupled to a UART 286, JTAG interface 375, watch dog 372, external timer 374, random number generator 376 and a clock 378 (e.g., an internal oscillator in a frequency locked loop).

To protect cryptographic processor 352 against attacks or snooping by general purpose processor 302 or other peripherals, internal communications interfaces between cryptographic processor 352 and general purpose processor 302 may be fused using an electronic fuse block 340, which is controlled only by the cryptographic processor 352.

Generally, cryptographic processor 352 may disable internal communications interfaces following manufacturing, test and configuration, in order to comply with certification requirements for certain FIPS 140-2 levels. When the internal communications interfaces are disabled via fuse block 340, a communications interface between cryptographic processor 352 and general purpose processor 302 can be provided via external peripheral devices, such as UART 386 and UART 326.

Fuse block 340 can also be used to enable or disable JTAG interface 325 or JTAG interface 375, as well as a Design For Test (DFT) interface 390 used to screen for manufacturing defects, or any other production test interface of the processor system 200 in general. Disabling the JTAG or test interfaces can prevent unauthorized attempts to modify the firmware of general purpose processor 302, cryptographic processor 352, or access any memory of the system.

The fuses for JTAG interface 325 may be controlled by cryptographic processor 352 independently of the fuses for JTAG interface 375, which can enable modification of firmware for general purpose processor 302, while preventing modification of firmware for cryptographic processor 352. This allows the cryptographic processor 352 to remain FIPS-compliant, while developing and debugging applications on the general purpose processor 302.

In addition to disabling JTAG and programming interfaces, cryptographic processor 352 can also halt the clock signal provided to general purpose processor 302. In particular, cryptographic processor 352 may have access to an internal register interface a clock block of the system 200. This register interface is controlled by cryptographic processor 352, and it can be used to halt the clock of general purpose processor 302 (for example by setting a register in the clock block).

While the clock of general purpose processor 302 is halted, a general purpose input/output port (not shown) may be used to indicate an error status. The error state control can be controlled by cryptographic processor 352.

To prevent clock timing attacks, while each processor 302 and 352 also controls its own clock divider network to set its own operating clock frequency, the setting of the main clock source 378 that feeds both divider networks is only controlled by the cryptographic processor. This prevents any attacks from malicious software running on the general purpose processor 302 from altering the clock of the cryptographic processor 352.

In some cases, fuse block 340 may be used to control clock input to general purpose processor 302, effectively halting any further processing by processor 302.

Similarly, power supply controls (e.g., 3.3V and 1.2V regulators) may be controllable by cryptographic processor 352, but not general purpose processor 302.

Random number generator 376 may be a NIST compliant True Random Number Generator (TRNG).

In general, system 200 implements a number of features designed to secure the system 200 against attack. For example, access to cryptographic unit 350 is allowed using a well-defined protocol, such as the GlobalPlatform Secure Channel Protocol 03 (SCP03). User access to cryptographic unit 350 requires a login, and user script hashes are checked against a list of permitted hashes provided at login time. In addition, only one user or administrator may be logged in to cryptographic unit 350 at any given time.

Figure 4A:
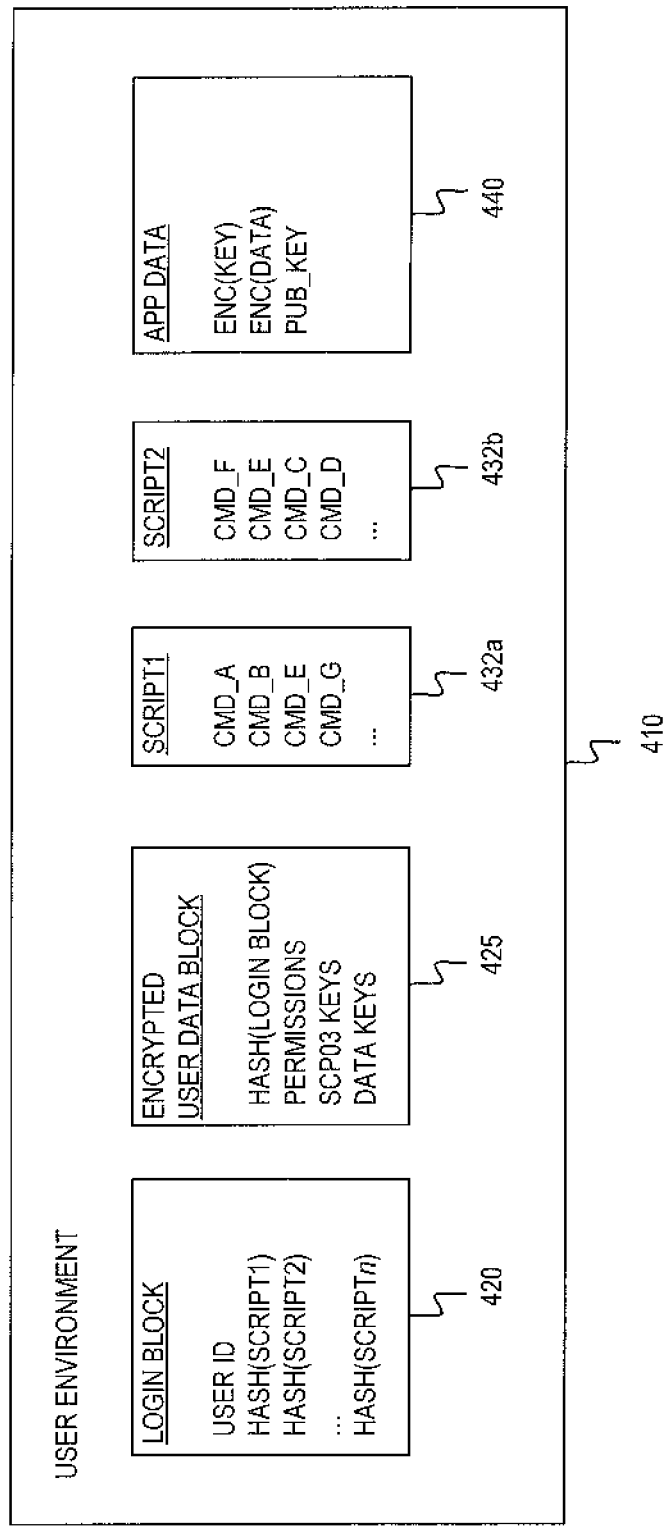
FIG. 4A is a schematic diagram of an example user environment in the system of FIG. 3.

Referring now to FIG. 4A, there is illustrated an example schematic diagram of a user environment in cryptographic unit 350. The user environment illustrates data held in memory (e.g., volatile and non-volatile) by cryptographic unit 350 and associated with a particular user. Data in the user environment does not include critical security parameters, such as secret keys.

For example, a user environment 410 for a first user includes a login block 420, an encrypted user data block 425, a first command sequence or script 432a and a second command sequence 432b, and an application data block 440. Each script 432 identifies a sequence of commands to be executed by a cryptographic processor 352, but generally does not include data to be operated on by the processor 352. Application data that is to be supplied to cryptographic processor 352 is stored in an application data block 440, which can include application data that has been encrypted and signed, for example by the cryptographic processor 352 on a previous occasion.

Login block 420 includes a user identifier and a list of hash values generated by applying a known one-way hash function to the scripts 432a and 432b. By providing hash values at login time, cryptographic processor 352 can independently verify that scripts have not been modified after login, before the scripts are executed by processor 352. If any scripts are modified, or if hash values are changed, cryptographic processor 352 can determine that modification has occurred, since the a hash calculation for the user's login block 420 will not match the login hash stored in a user's data block, as shown in FIG. 4B.

Figure 4B:
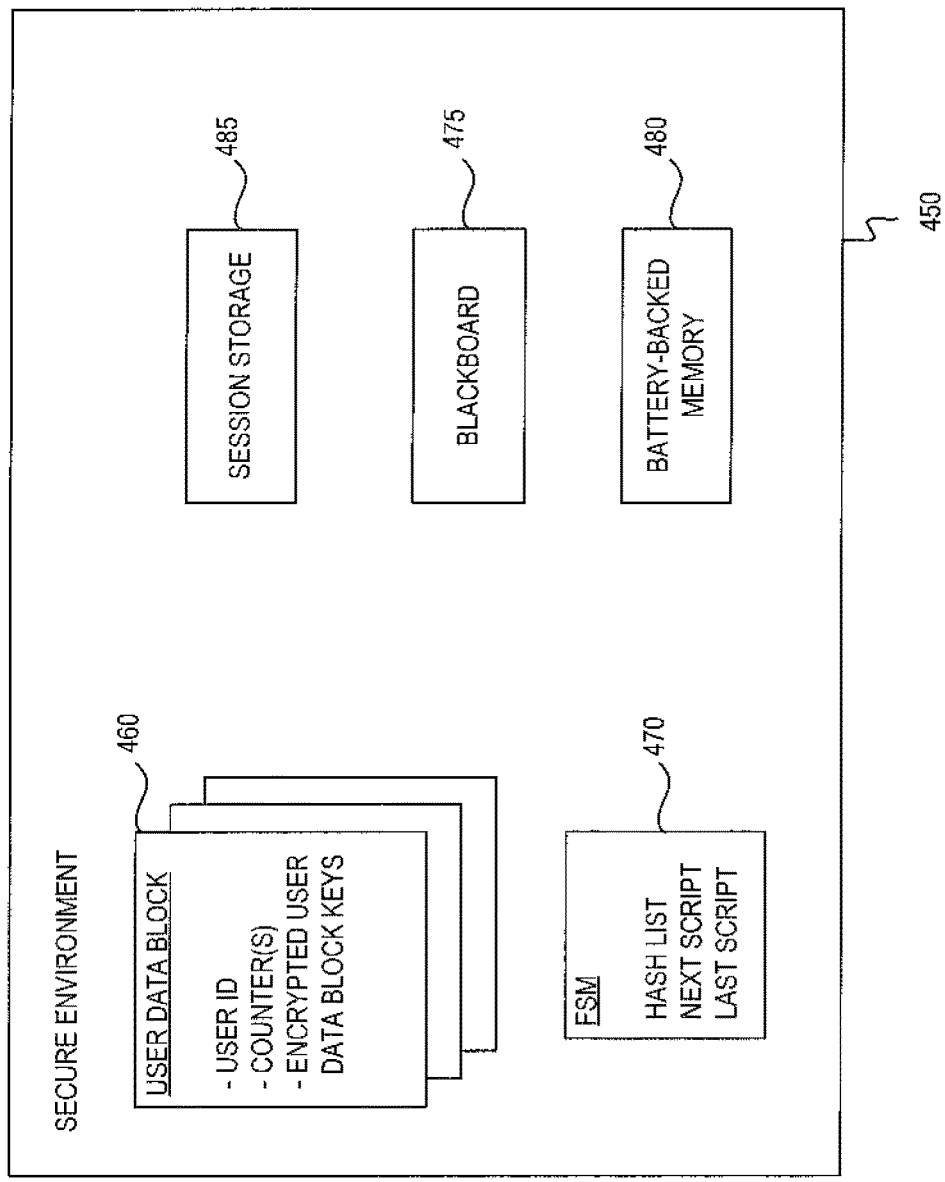
FIG. 4B is schematic diagram of an example secure environment in the system of FIG. 3.

Encrypted user data block 425 is encrypted and, optionally, signed using user data block encryption keys stored only within a secure environment of cryptographic processor 352 as shown with reference to FIG. 4B. Accordingly, while encrypted user data block 425 may be stored outside cryptographic processor 352, the data within the encrypted user data block 425 is only accessible within cryptographic processor 352.

Encrypted user data block 425 may store data including a user identifier, a login hash, data regarding user permissions, cryptographic keys used for SCP03 communication and data keys. Data keys are one or more keys generated for each user and used for data encryption or cryptographic signing operations.

Referring now to FIG. 4B, there is illustrated an example schematic diagram of a secure environment, such as that of cryptographic processor 352.

Secure environment 450 includes at least one user data block 460, a finite state machine block 470, a session storage block 485, a semi-persistent "blackboard" block 475 and a battery-backed volatile memory block 480.

Battery-backed volatile memory block 480 may be used to store the Local Master Key (LMK), which is used to encrypt other keys generated by cryptographic processor 352, such as Firmware Management Master Key (FMK), Crypto Officer Master Key (CMK), User Master Key (UMK), and the like.

User data block 460 may include, for example, a user identifier, counters (e.g., for detecting or preventing side channel attacks as described herein) and one or more encryption/signing keys for encrypting, decryption, signing and verifying the encrypted user data block 425.

A Cryptographic Officer (CO) is an administrative user who is granted permission to create, update or remove user accounts inside the cryptographic processor 352.

In particular, the CO can generate or set user authentication keys, which include SCP03 master keys (Message Authentication Code Key: MAC, Encryption Key: ENC and Key Encryption Key: KEK, which are 256-bit Advanced Encryption Standard (AES) symmetric keys with associated key derivation data) or Key Agreement Keys (e.g., user server signature verification public key, user server static public key, user static key pair with both public and private key).

The CO can also generate data keys for each user, set the user's login hash, and grant or remove user privileges.

Privileges can include, for example: a list of commands (e.g., from an application programming interface) available to the user; permission to read and/or write to the blackboard memory; permission to read and/or write to the battery-backed memory; permission to login using a login block, permission to open an SCP03 channel (Symmetric or Asymmetric) with the system; permission to update the user's own authentication keys; and permission to set or update the user's own login hash. Not all of these permissions need be available or implemented in every embodiment. For example, in some embodiments, a permission to read or write to the blackboard or battery-backed memories may not be available.

The CO can be enabled to communicate with the system via a SCP03 connection. In some embodiments, the CO user is prevented from executing application programming interface (API) commands in cryptographic processor 352. To enforce this and to prevent tampering with user data, the cryptographic processor 352 may be configured to erase its volatile memory when a CO logs in.

Once created by the CO, a regular user can log in to cryptographic processor 352 using the assigned login block, and execute scripts.

If permitted, the user can also login via SCP03 and reset the user's own authentication keys and login hash.

Each user account has certain data stored, encrypted and signed, in a user environment, such as user environment 410 described with reference to FIG. 4A. The account data generally includes a user ID, a login hash (e.g., a hash of the login block 420), authentication keys, SCP03 Master keys (MAC, ENC, KEK) or Key Agreement Keys, data keys (e.g., one for data encryption, one for signing), a list of user permissions and a storage quota for non-volatile and volatile memories.

It may be desirable for a user to save data between login sessions. Accordingly, users may be allocated a block of memory in the blackboard block 475 of cryptographic processor 352 for this purpose. Each user's portion of the blackboard block 475 can only be written to or read by the specific user. The blackboard block 475 is stored in volatile memory, so that it does not persist beyond a reset of the system.

In general, users are prevented from permanently storing any data in cryptographic processor 352. Accordingly, user authentication keys can be set by the CO. However, some users may have permission to update their authentication keys or login hash via SCP03.

Any application data that is to be stored by users should be stored outside the cryptographic processor 352, in general purpose non-volatile memory or mass storage, for example. Since cryptographic processor 352 is generally configured not to export any critical security parameters in unencrypted form, the user cannot accidentally expose critical security parameters by storing them in unprotected general purpose memory.

When the system 200 is in an operational state, a user can authenticate by one of two ways. In a first authentication approach, SCP03 Mutual Authentication to a server can be used. In another approach, the user can login using a login block. Login via SCP03 allows the user to execute any command in they have been granted permission to use. Login via the login block allows the user to execute pre-authorized scripts (command sequences) only.

Login via a login block comprises sending a user identifier and a data block, which includes a list of hashes of the scripts the user is allowed to execute. The hash of the data block supplied by the user must match the login hash stored in the user data block. In effect, the data block acts as the user's password. Optionally, the login block may be encrypted or authenticated with a message authentication code.

Scripts, or command sequences, are deliberately limited to a set of predefined operations or instructions. This limited instruction set is designed to minimize the risk of exploitable code or instructions being passed to cryptographic processor 352, by limiting the available instructions to commands that cannot provide Turing equivalent processing.

In particular, to avoid Turing equivalence in scripts, support for iteration, conditional branching and flow control is deliberately excluded from the command set. Thus, command sequences are limited to a linear list of commands. Since the script cannot perform iteration and flow control, a user application, which executes on general purpose processor 302, can be adapted to submit multiple scripts as necessary. Any error during execution of a script may result in the termination of the session.

Scripts generally have a name or script identifier. In general, scripts have no dependencies on any previous scripts. Cryptographic processor 352 can be configured to clear all previously retained data in session storage 485 prior to the execution of each new script.

However, in some cases, it may be desirable to provide a mechanism for enforcing the order in which a series of related sequences are executed. To support this, finite state machine block 470 can maintain a hash list of scripts. Each script can contain a command indicating that the script is the start or end script of a series of scripts. The cryptographic processor 352 can record a sequence's identifier in finite state machine block 470 and present this identifier to a subsequent script. Scripts can also include a command that designates the next script that should be executed, which when set should treat as an error attempts to run a script other than the one designated. Scripts may also contain commands to verify that a particular script preceded the present script's execution, by checking a previous sequence identifier stored in finite state machine block 470. Data used by a series of scripts can be retained in session storage 485 while the series of scripts is completed.

In addition to the CO and ordinary users, additional users may also be provided by cryptographic processor 352.

A Transport Management User (TM) can be provided and used in an initial "creation state" create the CO. System 200 is in a creation state after manufacturing, or following a "BOOT" application protocol data unit (APDU) command. While in the creation state, the only permitted operations are the creation of the Transport Management Key (TMK), updating of the TMK and the creation of the CO (in which case the LMK is generated).

Once the CO is created, system 200 switches to an operational state.

In the event that an attack is detected (e.g., backup battery removal), system 200 can switch to a terminated state. While in the terminated state, no further processing can be performed. System 200 can exit the terminated state by reverting to the creation state following the attack, or following a power-cycle.

In the illustrated embodiment, system 200 is implemented on a single processor die. However, in alternative embodiments, multiple processor dice may be used. For example, general purpose unit 301 may be implemented on a first processor die, while cryptographic unit 350 may be implemented on a second die.

In some cases, system 200 can also provide countermeasures against some attacks, such as side-channel attacks against SCP03 symmetric keys. In particular, cryptographic processor 352 may include two counters for each symmetric key used by the system.

To slow side-channel attacks symmetric keys, each attempt to use a key will be counted, and each successful attempt will be counted separately. If there is a difference between counts, system 200 can implement a delay between subsequent key usage attempts. The delay may scale based on the difference between the two counters. For example, the delay may correspond to X seconds, where X is the difference in the counts. A maximum difference may also be specified, to set an upper limit on the delay.

Figure 5A:
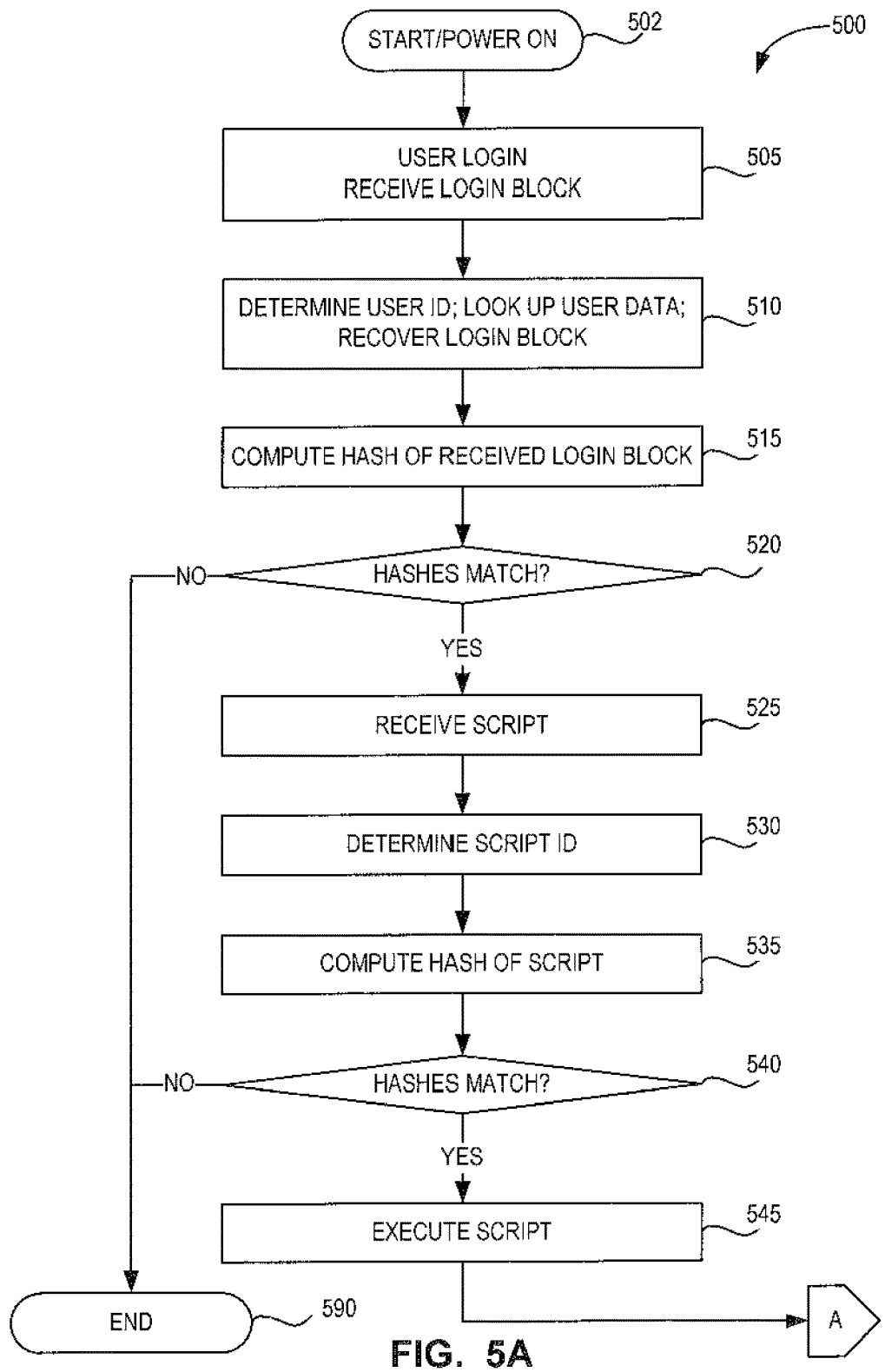
FIGS. 5A and 5B is a process flow diagram for an example method of cryptographic processing in conjunction with a general purpose processor.

Referring now to FIG. 5A, there is illustrated a flow diagram for an example method of cryptographic processing in conjunction with a general purpose processor.

Method 500 begins at 500, with system 200 being powered on or reset. For ease of exposition, system 200 is assumed to have been configured with a CO and one or more users. Accordingly, non-volatile memory 364 should contain a LMK, TMK, FMK, and CO data encrypted with the LMK.

As described herein with reference to FIGS. 4A and 4B, limited user data can be stored in a user data block 460 stored within cryptographic unit 350. Additional user data can be stored in an encrypted user data block 425 stored within general purpose unit 301, where the encrypted user data block 425 is encrypted and signed by cryptographic unit 350 such that the data it contains is not accessible to general purpose unit 301. The user data block 460 can include the user identifier, counters and encrypted user data block keys. The encrypted user data block 425 may include the user identifier, user keys, a login hash, permissions data, further counters assigned to the user, blackboard block quota, and battery-backed memory quota. User keys may be symmetric keys (in which case the data includes a personalization identifier, a key index, key version, ENC key, MAC key and KEK key) or asymmetric keys (in which case the data includes a personalization identifier, elliptic curve key pair, server key agreement public key and server signature verification public key).

At 505, system 200 receives a login block, for example, via a NFC communication interface (e.g., analog frontend 338, link control 336, peripheral bus 320, bridge 312, first hardware bus 304, general purpose processor 302, fuse block 340 and on to cryptographic processor 352.

Cryptographic processor 352 determines the user identifier associated with the received login block at 510, locates a corresponding user data block 460 and retrieves the decryption key for the encrypted user data block 425 for the identified user. Cryptographic processor 352 also requests the encrypted user data block 460 for the identified user and the login block 420 stored in the user environment (e.g., by general purpose unit 301).

Cryptographic processor 352 determines the user identifier associated with the received login block at 510, locates a corresponding user data block 460 and retrieves the decryption key for the encrypted user data block 425 for the identified user. Cryptographic processor 352 also requests the encrypted user data block 460 for the identified user and the login block 420 stored in the user environment (e.g., by general purpose unit 301).

Once the decryption key is found and the encrypted user data block 425 is received, cryptographic processor 352 decrypts the encrypted user data block 425 to recover user data.

At 515, cryptographic processor 352 computes a hash computation using the recovered raw login block to produce a computed login block hash.

At 520, cryptographic processor 352 compares the computed login block hash to a stored login block hash that is stored in user data block 460 in its non-volatile memory 364. If the two hash values fail to match, an error condition is identified and the cryptographic processor 352 may halt or reset processor system 200.

If the two hash values match, cryptographic processor 352 indicates to general purpose processor 302 that login was successful, and waits to receive a script for execution.

At 525, cryptographic processor 352 receives a script for execution. Optionally, cryptographic processor 352 may receive additional data to be used during execution of the script.

Cryptographic processor 352 parses the received script to identify a script identifier at 530.

At 535, cryptographic processor verifies that the script is authorized for execution on the cryptographic processor by the current user, by computing a script verification value (e.g., hash function) using the received script as input.

At 540, the computed script verification value for the script is compared to the script verification value (hash value) stored in the login block received from the user. If the script verification values do not match, this may indicate an attempt to circumvent security, and an error condition is identified and the cryptographic processor 352 may halt or reset processor system 200.

If the script verification values match, cryptographic processor 352 proceeds to execute the script at 545.

Since the user data block pre-configured and stored in encrypted form by cryptographic processor 352 in its non-volatile memory contains the login hash for each user's login block, and since each user's login block contains a hash of each authorized script, cryptographic processor 352 can verify that each script it receives is authorized and unmodified by hashing each script and comparing to the hash values in the login block received from the user, which is itself hashed and compared to a known hash value. This hash-on-hash scheme allows for cryptographic processor 352 to operate with minimal memory requirements, and there is no need for cryptographic processor 352 to store scripts, or even the script verification values for the scripts.

This allows the cryptographic processor to be certified for FIPS compliance, and have its firmware "frozen", without the need to foresee every possible script that may need to be executed.

Figure 5B:
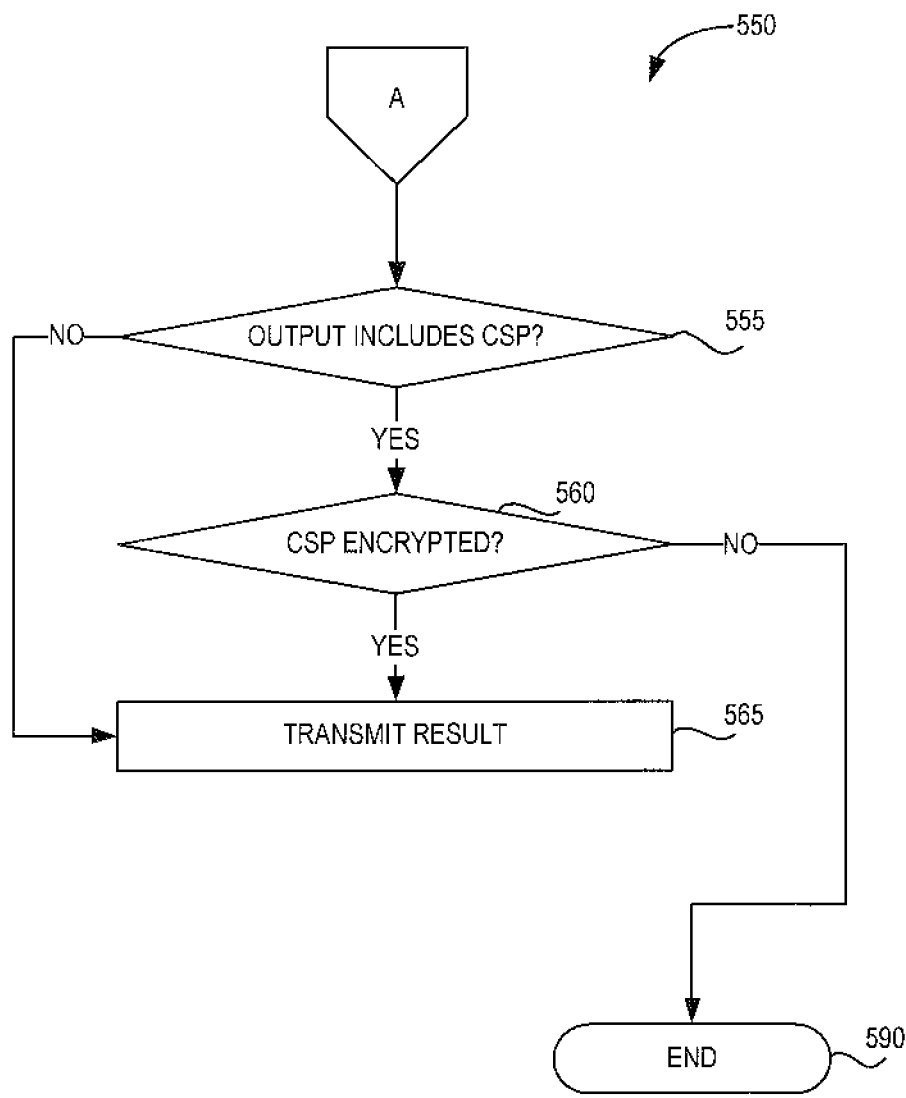

Referring now to FIG. 5B, there is illustrated a continuation of the method of FIG. 5A.

Once a script has completed execution, cryptographic processor 352 may determine whether the output of the script contains a critical security parameter that must be encrypted (e.g., encryption key), and whether the critical security parameter is encrypted in the output. Critical security parameters includes any data that may not be output in unencrypted form if FIPS certification is to be achieved and maintained.

At 555, cryptographic processor 352 determines whether the output contains a critical security parameter.

If no critical security parameter is included, the output may be transmitted to general purpose processor 302 at 565, either encrypted or in the clear, for further use by an application program.

Otherwise, at 560 cryptographic processor 352 determines if the critical security parameter included in the output is encrypted. If the critical security parameter is encrypted, the output may be transmitted at 565.

Otherwise, if the critical security parameter is not encrypted, or if a condition has not been satisfied at 520 or 540, for example, cryptographic processor 352 may halt execution of the current script without transmitting the output. An error message may be transmitted instead. Optionally, cryptographic processor 352 may halt general purpose processor 302 entirely, as described herein.

Accordingly, the described embodiments provide for a cryptographic calculator approach, in which a first, general purpose processor is relieved of the need to perform sensitive cryptographic operation. A second, cryptographic processor is dedicated to performing cryptographic operations and enforcing the security of critical security parameters. In some cases, both the general purpose and cryptographic processors may be similarly specified processors, in terms of processing design (e.g., both may be similar RISC or ARM processors).

The cryptographic processor protects sensitive data from exposure outside the cryptographic processor itself. For example, a master data encryption key is stored in a battery-powered volatile memory exclusive to the cryptographic processor. The master key may be used to encrypt a master key for each user application.

When data exceeds the protected storage available to the cryptographic processor, the cryptographic processor may encrypt such data and allow it to be stored by general purpose processor, which allows for virtually unbounded secure storage.

The cryptographic processor executes a firmware that is stored in protected non-volatile memory, and which can be certified for FIPS 140-2 compliance. The firmware implements a FIPS-compliant scripting engine, which limits scripts to a sequence of commands by design. The general purpose processor can submit scripts for execution inside the cryptographic processor using the scripting engine, where critical security parameters (e.g., secret keys) can be used.

Because the general purpose processor is physically prevented from accessing the cryptographic processor or its protected memory, it can be excluded from portions of the FIPS certification process. Moreover, the general purpose processor can be permitted to run arbitrary programs without invalidating the FIPS certification of the system.

Accordingly, the general purpose processor executes a firmware that can be modified more freely, albeit still under the control of the cryptographic processor, without invalidating FIPS certification of the system. For example, firmware updates for one or both processors can be managed and controlled using keys stored in the cryptographic processor. Firmware images may be checked to verify that they have been signed by a known or trusted source.

The described embodiments can be configured to support a wide variety of cryptographic algorithms, including but not limited to, AES, Data Encryption Standard (DES), Triple Data Encryption Algorithm (3DES), Elliptic Curve Cryptography (ECC), Rivest-Shamir-Adleman (RSA) algorithm, and the family of Secure Hash Algorithms (SHA). Various of these algorithms can also be used to implement Message Authentication Code (MAC), Cipher-based MAC (CMAC), and keyed-hash message authentication code (HMAC).

The described embodiments can also be configured to support common protocols, such as GlobalPlatform SCP03, key agreement schemes (SP800-56A and SP800-56B) and even Transport Layer Security (TLS/SSL).

Figure 6:
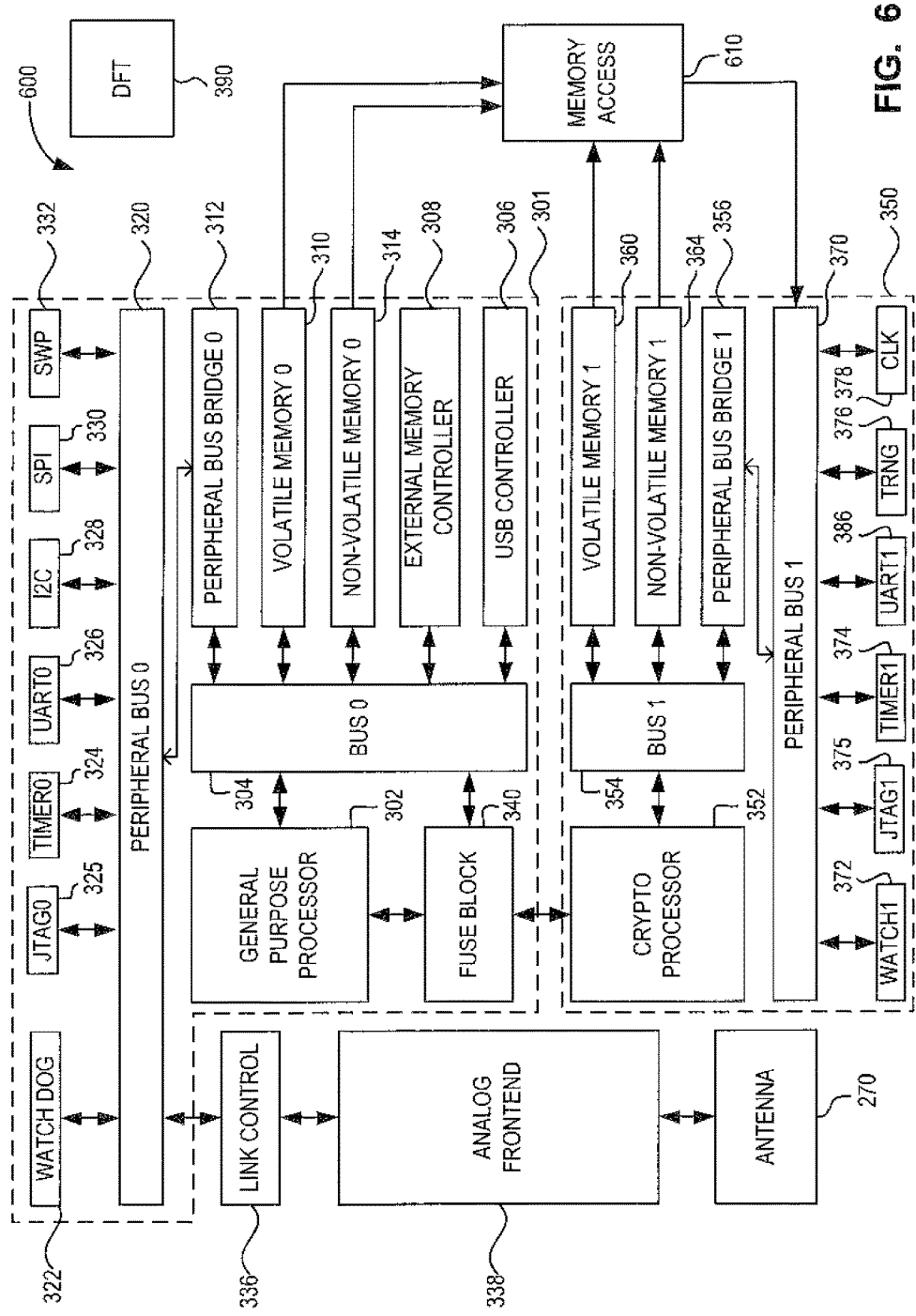
FIG. 6 is a system block diagram of an example cryptographic processor system.

Referring now to FIG. 6, there is illustrated another example cryptographic processor system 600. System 600 is generally analogous to system 200, and like elements are labeled using like reference numerals.

System 600 differs from system 200 in that it includes a block 610, which is able to directly access the memories of both general purpose unit 301 and cryptographic unit 350. In particular, memory access block 610 can read volatile memory 310, non-volatile memory 314, volatile memory 360 and non-volatile memory 364. Memory access block 610 can directly each memory in a read-only fashion to verify its contents. However, cryptographic processor 352 is not configured to actively use memory via memory access block 610 for program execution or data storage. Preferably, memory access block 610 cannot write to any of these memories. Accordingly, cryptographic processor 352 can indirectly read volatile memory 310 or non-volatile memory 314, via memory access block 610, without the intermediation of general purpose processor 302. This allows more complete checks of memory 310, such as computing hashes to verify the integrity of the application software being executed by general purpose processor 302.

To facilitate verification, memory access block 610 may also include a verification element to perform computations using at least one verification value, such as a Cyclic Redundancy Check (CRC) to calculate CRC checksums that can be used to periodically verify memory contents. The calculated checksums are only output to cryptographic processor 352, for example, via peripheral bus 370. Other checksum or cryptographic verification functions may also be incorporated into memory access block 610.

The described systems and methods are capable of being used in a variety of environments. For example, a module incorporating a system 200 could be installed in any computing device and tasked with supplying general cryptographic functions, such as calculating hashes. In such applications, no keys or data would need to be stored in a secure manner, and there would be no requirement to deny access to any instance of the user. A login block and user data block could be created for a user, where the login block contains a list of hashes for a wide variety of anticipated scripts. The user can subsequently login using the login block, and can use scripts as required without the need for any additional configuration.

In another example, system 200 can be used to support a virtual token application, in which system 200 can emulate a smartcard device. The virtual token may include software that executes on a general purpose processor. The software includes an implementation of the SCP03 protocol for external communication, while the cryptography processor can be configured to perform SCP03 encryption, decryption, key generation, and other card functions.

In practice, the virtual token application may be implemented by including scripts for SCP03-related cryptography in the virtual application token. A login data block can be created for the token application and a hash of the login data block stored in the user data block by the cryptographic processor.

Personalization may occur in a secure facility, in similar fashion to conventional smartcards. For example, a personalization application may use CO access to create a user identifier for the virtual token application (i.e., login hash, signing key and data key, etc.).

The general purpose processor has access to the SCP03 user identifier, login block and scripts necessary to create a SCP03 to a server. The token application, executing on the general purpose processor, can use the SCP03 user id, login and scripts to have cryptographic processor create and encrypt the keys for its SCP03 connection to the server. The encrypted keys are received from the cryptographic processor and stored in non-volatile memory for subsequent use.

When establishing a SCP03 connection to a server, the token application, executing on general purpose processor, can use appropriate scripts to send its encrypted SCP03 keys to the cryptographic processor, which can then decrypt and use the SCP03 keys within the cryptographic processor environment to create session keys and to encrypt and decrypt messages to and from the server.

Aspects of the embodiments described herein may be implemented in hardware or software, or a combination of both. These aspects may be implemented in computer programs which execute on programmable computers, each computer including at least one processor, a data storage system (including volatile memory or non-volatile memory or other data storage elements or a combination thereof), and at least one communication interface, as described, for example, with reference to FIGS. 2 and 3. The various programmable computers may be a server, network appliance, set-top box, embedded device, computer expansion module, personal computer, laptop, personal data assistant, cellular telephone, smartphone device, tablet and wireless hypermedia device or any other computing device capable of being configured to carry out the methods described herein. For greater certainty, the programmable Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication (IPC). In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or RAM, where the data stored thereon is only temporarily stored. The computer useable instructions may also be in various forms, including compiled and non-compiled code.

The present invention has been described here by way of example only, while numerous specific details are set forth herein in order to provide a thorough understanding of the example embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these example embodiments. The scope of the claims should not be limited by the described embodiments and examples, but should be given the broadest interpretation consistent with the description as a whole.

The invention claimed is:

1. A cryptographic processing unit that cooperates with a general purpose processor to perform cryptographic processing, the cryptographic processing unit comprising:
   a protected memory that is readable by the cryptographic processing unit but is not readable by the general purpose processor, wherein (1) the protected memory stores script hashes, a script hash being a value generated by applying a one-way hash function to a script, which is a set of pre-defined executable instructions, where the script does not include data to be operated on, and (2) the protected memory does not store scripts corresponding to the stored script hashes; and
   a cryptographic processor configured to verify that a script received from the general purpose processor is authorized for execution on the cryptographic processing unit, by performing steps comprising:
   (a) accessing, from the protected memory, one or more script hashes, the one or more script hashes being associated with a user data block for a user of the cryptographic processing unit;
   (b) receiving, from the general purpose processor, a script intended for execution on the cryptographic processing unit;
   (c) hashing the received script to generate a received script hash value, by applying a one-way hash function to the received script;
   (d) comparing the received script hash value to a script hash of the one or more script hashes associated with the user data block;
   (e) in a case that the received script hash value matches the script hash of the one or more script hashes, (1) determining that the script is authorized for execution on the cryptographic processor, (2) executing the received script to produce a script result, and (3) transmitting the script result to the general purpose processor; and
   (f) in a case that the received script hash value does not match any script hash of the one or more script hashes, identifying an error condition and performing one of: halting operation of the general purpose processor or resetting operation of the general purpose processor.

2. A cryptographic processing unit that cooperates with a general purpose processor to perform cryptographic processing, the cryptographic processing unit comprising:
   a protected memory that stores script hashes; and
   a cryptographic processor configured to:

(a) access, from the protected memory, one or more script hashes, the one or more script hashes being associated with a user data block for a user of the cryptographic processing unit;
(b) receive, from the general purpose processor, a script for execution on the cryptographic processor;
(c) hash the script to generate a received script hash value;
(d) compare the received script hash value to a script hash of the one or more script hashes associated with the user data block; and
(e) in a case that the received script hash value matches the script hash of the one or more script hashes, (i) determine that the script is authorized for execution on the cryptographic processor, and (ii) execute the script to produce a script result.

3. The cryptographic processing unit of claim 2, wherein the script result comprises a critical security parameter, the critical security parameter being data that is not permitted to be transmitted outside the cryptographic processing unit in unencrypted form, and
wherein the cryptographic processor is further configured to:
(a) in a case that the critical security parameter in the script result is encrypted, transmit the script result to the general purpose processor, and
(b) in a case that the critical security parameter in the script result is not encrypted, perform at least one of: (1) halting execution of the script, (2) transmitting an error message to the general purpose processor, (3) halting operation of the general purpose processor, (4) resetting operation of the general purpose processor, and (5) disabling an internal or external communication interface of the general purpose processor.

4. The cryptographic processing unit of claim 3, wherein the cryptographic processor halts or resets operation of the general purpose processor by controlling (a) a power supply of the general purpose processor or (b) a clock signal of the general purpose processor.

5. The cryptographic processing unit of claim 2, wherein neither the script received from the general purpose processor nor the received script hash value is stored in the protected memory.

6. A cryptographic processing system comprising:
a general purpose unit comprising a general purpose processor; and
a cryptographic processing unit comprising (a) a protected memory that stores script hashes and (b) a cryptographic processor configured to:
(1) access, from the protected memory, one or more script hashes, the one or more script hashes being associated with a user data block for a user of the cryptographic processing unit;
(2) receive a script from the general purpose processor, the received script being a script for execution on the cryptographic processor;
(3) hash the script to generate a received script hash value;
(4) compare the received script hash value to a script hash of the one or more script hashes associated with the user data block; and
(5) in a case that the received script hash value matches the script hash of the one or more script hashes, (a) determine that the script is authorized for execution on the cryptographic processor, and (b) execute the script to produce a script result.

7. The cryptographic processing system of claim 6, wherein the script result comprises a critical security parameter, and
wherein the cryptographic processor is further configured to:
(a) in a case that the critical security parameter in the script result is encrypted, transmit the script result to the general purpose processor, and
(b) in a case that the critical security parameter in the script result is not encrypted, perform at least one of: (1) halting execution of the script, (2) transmitting an error message to the general purpose processor, (3) halting operation of the general purpose processor, (4) resetting operation of the general purpose processor, and (5) disabling an internal or external communication interface of the general purpose processor.

8. The cryptographic processing system of claim 7, wherein the cryptographic processor halts or resets operation of the general purpose processor by controlling (a) a power supply of the general purpose processor or (b) a clock signal of the general purpose processor.

9. The cryptographic processing system of claim 6, wherein neither the script received from the general purpose processor nor the received script hash value is stored in the protected memory of the cryptographic processing unit.

10. A method for cryptographic processing by a cryptographic processor of a cryptographic processing unit, the method comprising:
accessing one or more script hashes from a protected memory, the one or more script hashes being associated with a user data block for a user of the cryptographic processing unit;
receiving a script from a general purpose processor, the received script being a script for execution on the cryptographic processor;
hashing the script to generate a received script hash value;
comparing the received script hash value to a script hash of the one or more script hashes associated with the user data block; and
in a case that the received script hash value matches the script hash of the one or more script hashes, (a) determining that the script is authorized for execution on the cryptographic processor, and (b) executing the script to produce a script result.

11. The method of claim 10, wherein the script result comprises a critical security parameter, and
wherein the method further comprises:
determining whether the critical security parameter in the script result is encrypted;
in a case that the critical security parameter in the script result is encrypted, transmitting the script result to the general purpose processor; and
in a case that the critical security parameter in the script result is not encrypted, performing at least one of: (1) halting execution of the script, (2) transmitting an error message to the general purpose processor, and (3) halting operation of the general purpose processor, (4) resetting operation of the general purpose processor, and (5) disabling an internal or external communication interface of the general purpose processor.

12. The method of claim 11, wherein the cryptographic processor halts or resets operation of the general purpose processor by controlling (a) a power supply of the general purpose processor or (b) a clock signal of the general purpose processor.

13. The method of claim 10, wherein neither the script received from the general purpose processor nor the received script hash value is stored in the protected memory of the cryptographic processing unit.

14. A cryptographic processing unit comprising a cryptographic processor configured to:
receive, from another processor, a set of executable instructions in the form of a script, the script being for execution on the cryptographic processor;
hash the script to generate a received script hash value;
compare the received script hash value to a script hash stored in a memory, the script hash stored in the memory being associated with a user data block for a user of the cryptographic processing unit, wherein data stored in the memory is readable only by the cryptographic processor; and
in a case that the received script hash value matches the stored script hash, (a) determine that the script is authorized for execution on the cryptographic processor, and (b) execute the script.

15. The cryptographic processing unit of claim 14, wherein the cryptographic processor is further configured to:
parse the script to identify a script identifier;
access a sequence identifier from a finite state machine of the cryptographic processing unit, where the finite state machine maintains a hash list of scripts and indicates an order of a series of related scripts to be executed;
determine, based on the script identifier and the sequence identifier, whether the script is the next script to be executed in the series of related scripts;
in the case the script is determined to not be the next script, transmit an error message to the other processor.

* * * * *